Patented Mar. 20, 1951

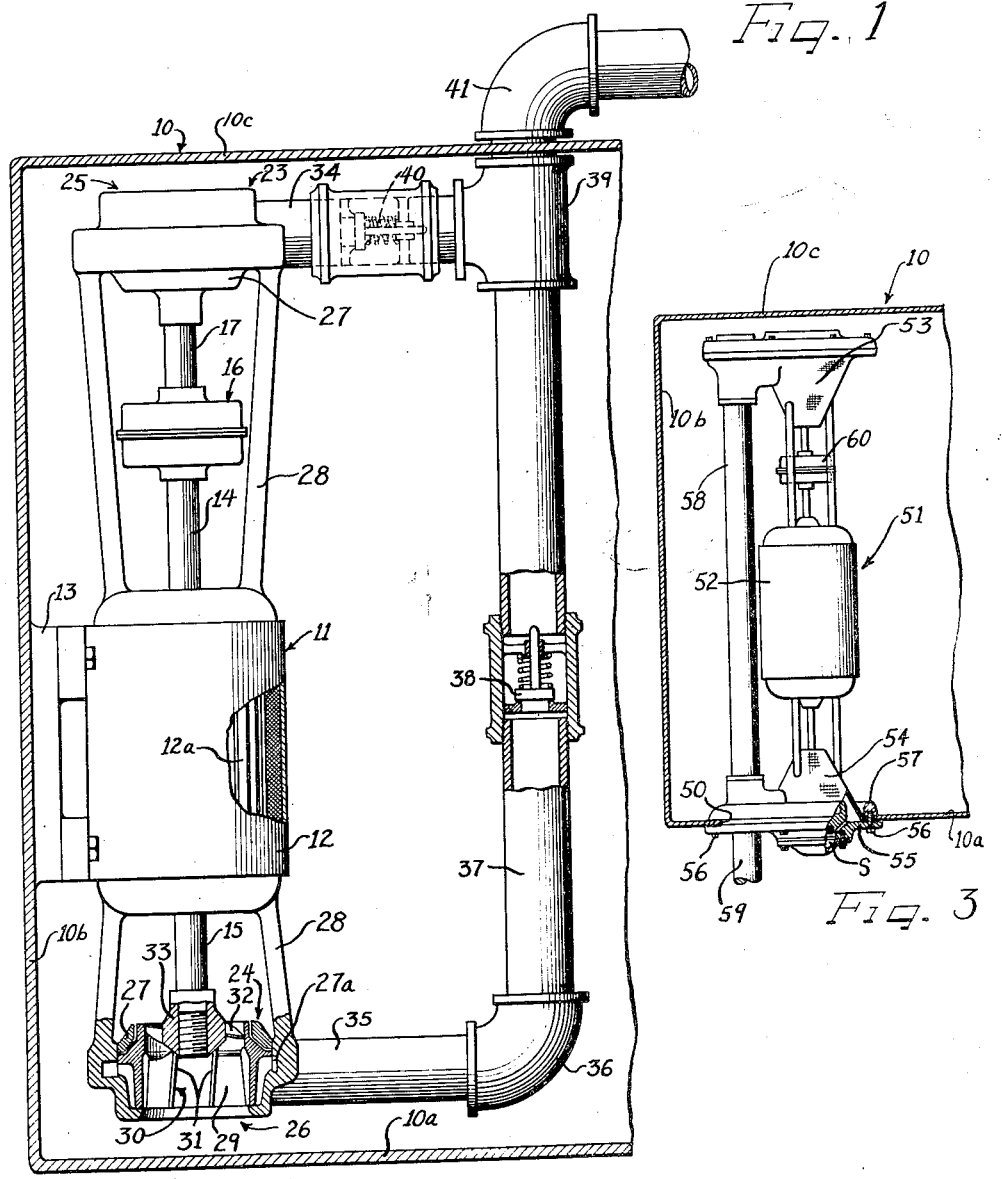
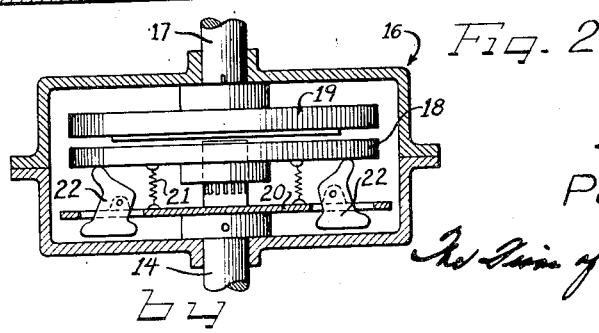

2,546,034

UNITED STATES PATENT OFFICE 2,546,034

MULTIPLE PUMP AND MOTOR UNIT FOR AIRCRAFT FUEL SYSTEMS

Paul J. Lansing, Los Angeles, Calif., assignor to Thompson Products, Inc., Cleveland, Ohio, a corporation of Ohio Application January 21, 1950, Serial No. 139,914

9 Claims. (Cl. 244—135)

This invention relates to a multiple fuel pump and motor unit particularly useful in an airplane fuel system.

Specifically the invention deals with a multiple pump and single electric motor unit having the pumps so arranged as to insure submersion of at least one pump inlet during all positions of a fuel cell in which the unit is mounted.

In aircraft fuel systems, it is essential to supply fuel from the fuel cell or tank to the engine-driven fuel pump or other engine fuel charging mechanism under all conditions of flight.

The modern high speed military type aircraft must perform efficiently during diving conditions, high angle climbing conditions, accelerating level flight conditions, and even in inverted flight conditions. Under many such extreme flight conditions, the fuel in a partially filled fuel cell will climb to the top and rear portions of the cell where it is not accessible to the inlet of a conventional booster pump or other fuel intake to the engine-driven fuel pump. For example, during a power dive, the downward acceleration may exceed acceleration due to gravity and thereby produce what is known as a negative gravity condition wherein the fuel will rise to the top of the cell. Similar circumstances are encountered even in level flight when the aircraft is accelerated continuously causing the fuel to collect at the rear portion of the cell. Of course, in inverted flight conditions, the top of the fuel cell becomes the bottom, and the fuel will fall away from the booster pump or other fuel feed from the cell.

Since a booster pump capable of eliminating vapors and gases from the fuel being fed to the engine must have its inlet completely submerged in the fuel, the normal booster pump which has its inlet mounted at the bottom of the fuel cell is not capable of continually supplying fully liquid fuel to the engine under the extreme flight conditions mentioned hereinabove.

Therefore, in accordance with this invention, there is provided a booster pump unit composed of a single motor and a plurality of pumps driven by said motor and arranged so that at least one of their respective inlets will always be submerged in fuel in the cell irrespective of the position of the fuel in the cell. A preferred pump arrangement according to this invention includes a separate booster pump at each end of an electric motor and a mounting for the unit which will position the inlet of one pump at or close to the bottom of the fuel cell while the inlet of the other pump is at or close to the top of the fuel cell. In addition, these inlets are preferably disposed toward the rear end of the cell. Since, in a partially filled fuel cell, only the inlet of the bottom pump will be submerged in fuel, during normal flight, a preferred arrangement includes a clutch for disconnecting the top pump from the motor until the inlet of the top pump is submerged in fuel. This clutch can conveniently take the form of a centrifugal clutch which will engage when the motor speeds up due to lack of fuel in the bottom pump. Check valves are also provided so that the discharge from one pump will not flow into the other pump.

It is, then, an object of this invention to provide a motor-driven multiple booster pump assembly having the respective pumps so arranged that the inlet of at least one pump will always be submerged in fuel irrespective of the position of the fuel in the cell.

Another object of the invention is to provide an aircraft booster pump unit effective to pressure fuel under all conditions of aircraft flight and operations.

A still further object of the invention is to provide a booster pump arrangement for supplying pressured fuel to an aircraft engine during negative gravity flight conditions as well as during normal flight conditions.

Another object of the invention is to provide a submerged booster pump and electric motor unit wherein a single electric motor has pumps mounted at each end thereof with their respective inlets arranged so that at least one inlet is always covered by fuel during all conditions of flight.

Other and further objects of the invention will be apparent to those skilled in the art from the following detailed description of the annexed sheet of drawings which, by way of preferred examples, illustrates two embodiments of the invention.

On the drawings:

Figure 1 is a vertical cross-sectional view through the rear portion of an aircraft fuel cell and showing the multiple pump and motor unit of this invention partly in elevation.

Figure 2 is a vertical cross-sectional view, with parts in elevation, and on an enlarged scale, of a centrifugal clutch used in the pump and motor unit of Figure 1.

Figure 3 is a view similar to Figure 1 but illustrating the manner in which the pump and motor unit of this invention can be mounted on the bottom of the fuel cell in accordance with this invention.

As shown on the drawings:

In Figure 1, the reference numeral 10 designates an aircraft fuel cell. Such a fuel cell 10 might be included in the wing or the fuselage of the aircraft. The cell 10 includes a bottom wall 10a, a rear wall 10b, and a top wall 10c. In addition, a front wall (not shown) is also provided. The pump and motor unit 11 of this invention has an electric motor 12 mounted on the rear wall 10b of the cell 10 intermediate the top and bottom walls as by means of any suitable hanger or mounting bracket 13. The motor 12 has an armature 12a driving a top drive shaft 14 and a bottom drive shaft 15 respectively projecting from the top and bottom of the motor. The motor is preferably of the type which will speed up when the load thereon is reduced. Motors such as straight series wound and compound wound with emphasis on the series winding are effective.

The top drive shaft 14 is coupled through a centrifugal clutch 16 to a driven shaft 17. As shown in Figure 2, the clutch 16 includes a driving disk 18 slidably splined on the drive shaft 14 and coacting with a driven disk 19 secured on the driven shaft 17. A plate 20 secured on the drive shaft 14 anchors springs 21 which pull the plate 18 away from the plate 19. Flyweights 22 are pivoted on this plate 20 and are arranged to fly outwardly under the influence of centrifugal force to force the clutch plate 18 against the clutch plate 19 thereby causing the shaft 17 to be driven from the shaft 14.

A top pump 23 is mounted on top of the motor 11 to be disposed close to the top wall 10c of the cell 10. A bottom pump 24 is mounted on the motor 11 to be disposed near the bottom wall 10a of the fuel cell. The pump 23 has an inlet 25 in the top thereof. The pump 24 has an inlet 26 in the bottom thereof. The pumps 23 and 24 are identical and each includes a pump casing 27 carried on posts or the like supports 28 from the ends of the motor 12. The pump casing 27 defines an annular pumping chamber or volute 27a communicating around its inner periphery with a central open ended chamber 29. A vapor separating type impeller 30 is mounted in this central chamber 29 and includes a ring of radial pumping vanes 31 effective to pressure liquid into the volutes 27a. Screw vanes or spaced propeller blades 32 connect the ring of vanes at their upper ends with the impeller hub 33 and this hub is secured to the drive shaft which in the case of the upper pump 23 is the shaft 17 and in the case of the lower pump 24 is the shaft 15.

The space in the central chamber 29 surrounded by the ring of pumping vanes 31 is in full open communication with fluid in the fuel cell 10 provided that the fuel covers the pump casing and inlet of the pump. This fuel is subjected to the centrifugal action of the pumping vanes and the heavier liquid components are discharged through the pumping or volute chamber 27a into peripheral discharge outlets including an outlet 34 for the top pump 23 and an outlet 35 for the bottom pump 24. The screw vane 32 is effective to cause an axial flow through the open ended chamber 29 to discharge bubbles of gases or vapors from the chamber and back into the fuel cell, so that only fully liquid material will be pumped into the pumping chamber. These bubbles will rise to the top of the fuel and burst at the surface level. The liberated gases and vapors are then vented out of the cell.

The bottom outlet 35 extends laterally from the pump casing 27 and is connected through an L 36 to an upstanding pipe 37 containing a spring-pressed check valve 38. This valve accommodates flow upwardly through the pipe 37 but prevents flow in the reverse direction. The upper end of the pipe 37 is connected to a T 39 which makes a right angle connection with the upper discharge conduit 34 from the pump 23. A check valve 40 is provided in the conduit 34 to accommodate flow from the pump 23 to the T 39 and to prevent flow in the reverse direction into the pump. An outlet tube 41 is connected to the top of the T to convey the fuel out of the cell 10.

In normal operation the unit 11 has the bottom pump 24 thereof submerged in fuel in the cell 10. Under such conditions the motor 12 will drive the shaft 15 at a moderate speed because of the liquid load on the pump impeller and the impeller will be effective to centrifugally pump fully liquid fuel through the outlet 35 while at the same time eliminating gases and vapors out of the upper end of the pump back to the fuel cell. However, when the inlet 26 of the pump 24 is uncovered, as during abnormal flight conditions, the impeller in this bottom pump will be free and unimpeded by the fuel. The drive shaft 15 will therefore have less resistance to rotation and the motor 12 will speed up. This speeding up of the motor will cause the weights 22 of the clutch 16 to fly outwardly and engage the clutch for driving the drive shaft 17, whereupon the impeller in the top pump will be driven, since the liquid fuel during these abnormal flight conditions will climb to the rear and top of the fuel cell and, since the inlet 25 of the top pump 23 is adjacent the top and rear end of the fuel cell, this inlet will be covered with fuel even though the normal fuel level of the cell is below the top inlet. Therefore, under these abnormal flight conditions, the impeller in the top pump will be effective to flow the fully liquid material through the outlet 34.

When the bottom pump is pumping fluid and the top pump is not pumping fluid, the check valve 38 will accommodate flow from the bottom pump while the check valve 40 will prevent flow from this pump back to the idle pump 23. Conversely, when the top pump is effective and the bottom pump is ineffective, the check valve 40 will accommodate flow to the outlet 41 while the check valve 38 will prevent flow back to the pump 24.

When both pumps are submerged and it is desired to utilize the pumping capacity of both pumps, as during take-off flight conditions and the like, the motor 12 can be speeded up sufficiently to engage the clutch 16, whereupon both pumps will be effective and an increased pumping capacity will be obtained.

In the event that it is desired to mount a multiple pump and motor unit according to this invention on the bottom wall of the fuel cell, the arrangement shown in Figure 3 can be used. In this arrangement, the fuel cell has an opening 50 in the bottom wall 10a thereof adjacent the rear wall 10b and a pump and motor unit 51 according to this invention is inserted through this opening and supported from the bottom wall 10a. This unit includes an electric motor 52, a top pump 53 on top of the motor 52, and a bottom pump 54 at the bottom of the motor 52. The bottom pump, however, is equipped with a base plate 55 that closes the opening 50 and is suspended from the bottom wall 10a by mounting bolts 56 which are threaded into a mounting ring 57 disposed on the bottom wall 10a around the opening 50. This base plate arrangement forms a sump S at the bottom of the fuel cell 10 and this sump is in full communication with the inlet of the bottom pump 54 and with the interior of the fuel cell. In this bottom mounting, the entire unit 51 can be inserted into the cell through the opening 50. The pumps 53 and 54 discharge through a common outlet conduit 58 which also extends through the base plate 55 to receive the fuel line 59 to the engine driven fuel pump of the aircraft.

A centrifugal clutch 60 can be provided in the drive shaft from the motor 52 to the top pump 53. The unit 51 will thereupon function in the same manner as the unit 11 described hereinabove.

From the above descriptions it will be understood that this invention provides a multiple pump and motor unit adapted to be submerged in airplane fuel cells or the like and so mounted that one of the pumps will always be covered by fuel in the cell even during periods of abnormal flight, including negative gravity flight conditions. The unit will maintain fuel pressure and supply fully liquid fuel material for engine operation. The pumps of the unit separate gases and vapors from liquid fuel and pressure the fully liquid fuel into the fuel line. The unit is effective as a high altitude booster.

It will be understood that modifications and variations may be effected without departing from the scope of the novel concepts of the present invention.

I claim as my invention:

1. In a fuel cell and submerged pump assembly for aircraft, the improvement of a multiple pump and motor unit for mounting in submerged condition in the fuel cell, said unit having an electric motor with shafts extending from opposite ends thereof, centrifugal type pumps mounted on the ends of said motor having impellers coupled to said shafts, each of said pumps having an open inlet adapted to freely communicate with fuel in said fuel cell, a common outlet for both of said pumps adapted to discharge out of the fuel cell, and means for mounting the unit in an upright position to place the pump inlets at different levels in the cell whereby one of said pump inlets will be submerged in liquid in the cell when the liquid rests on the bottom of the cell as well as when the liquid rises off of said bottom to rest on the top of the cell.

2. In an aircraft fuel system including a fuel cell having a bottom wall supporting fuel under positive gravity flight conditions and a top wall supporting fuel under negative gravity flight conditions, the improvement of a multiple fuel booster pump and electric motor unit in said cell, said unit having an electric motor with drive shafts extending from opposite ends thereof, vapor separating booster pumps mounted on the ends of the motor and each having an impeller coupled to the adjacent drive shaft, each of said booster pumps having an individual inlet, a common outlet for both of said pumps, and means for mounting said unit in an upright position to place the inlets at different levels in the fuel cell, whereby at least one of said inlets will be submerged in fuel under negative gravity as well as positive gravity flight conditions.

3. In an aircraft fuel cell assembly having a bottom wall for supporting fuel under positive gravity flight conditions and a top wall for supporting fuel under negative gravity flight conditions, the improvement which comprises a multiple booster pump and electric motor unit in said fuel cell, said unit comprising an electric motor, vapor separating pumps at opposite ends of the motor, a common outlet for said pumps, each of said pumps having its own inlet, means coupling the electric motor to each pump, and a mounting bracket for affixing the unit to the fuel cell to position the inlets of the pumps at different levels, whereby at least one of said pump inlets will be submerged in fuel under positive gravity flight conditions when the fuel rests on the bottom wall of the fuel cell as well as under negative gravity flight conditions when the fuel rests on the top wall of the fuel cell.

4. In an aircraft fuel cell having a bottom wall for supporting liquid fuel under positive gravity flight conditions and a top wall for supporting the liquid fuel under negative gravity flight conditions, the improvement which comprises a pump and motor unit mounted in said cell having a plurality of pumps with a common outlet and separate inlets positioned in vertically spaced relationship within the cell, each of said pumps having a vapor separating impeller, an electric motor between said pumps for driving the impellers thereof, a check valve in the outlet of the uppermost pump adapted to open only when the pressure in said uppermost pump exceeds a predetermined pressure over outlet pressure, and means for fixedly mounting said unit in said fuel cell whereby at least one of said pump inlets will be submerged in fuel under negative gravity as well as positive gravity flight conditions.

5. In an aircraft fuel cell having a bottom for supporting liquid fuel under positive gravity flight conditions and a top for supporting liquid fuel under negative gravity flight conditions, the improvement which comprises a multiple pump and motor unit having an electric motor with drive shafts extending from opposite ends thereof, a vapor separating pump mounted on each opposite end of the motor and having an impeller driven by the adjacent shaft, an outlet for each of said pumps, each of said pumps having a separate inlet at opposite ends of the motor, means for mounting the unit in vertical position in the fuel cell to position the inlet of one pump adjacent said bottom of the cell and the inlet of the other pump adjacent said top of the cell, and a clutch in the drive shaft between the top pump and the motor for coupling the impeller of the top pump with the motor under negative gravity flight conditions, whereby said lower pump will deliver fuel under positive gravity flight conditions while said upper pump will deliver fuel under negative gravity flight conditions.

6. A booster pump unit adapted for aircraft fuel cells or the like to supply vapor freed fuel under conditions of positive and negative gravity flight which comprises a single electric motor, separate pumps mounted on opposite ends of the electric motor, a vapor separating impeller in each pump driven by said motor, each pump having a separate open inlet in the face thereof away from said motor, a common outlet for both pumps extending alongside of the motor, check valves between each pump and the outlet adapted to open only when pressure in the pump exceeds the outlet pressure, whereby liquid will not flow from one pump to the other pump, and means for mounting said unit in upright position in a fuel cell to place the pump inlets at different levels, whereby at least one pump will be submerged under negative as well as positive gravity flight conditions.

7. A multiple pump and motor unit adapted for submersion in an aircraft fuel cell or the like which comprises a single electric motor, drive shafts extending from the ends of said motor, pump casings at the ends of said motor, each pump casing having a vapor separating pump impeller therein coupled with a motor drive shaft, means for mounting the assembly in upright position in a fuel cell to position the inlets of the pumps at superimposed levels, and a centrifugal clutch in the drive shaft between the top pump and the motor and constructed and arranged to drive the impeller in the top pump whenever the motor speed increases beyond a normal speed.

8. In an aircraft fuel system having a fuel cell, a plurality of rotor equipped pumps disposed in said cell in vertically spaced relationship, a motor disposed between said pumps and coupled to the rotors of said pumps for driving the pumps, said pumps having separate inlets in vertically spaced relation respectively above and below said motor, a common outlet for said pumps, and means for mounting said pumps and motor as a unit in said fuel cell to be submerged in fuel in the fuel cell with the inlet of one pump at a higher level than the inlet of the other pump, whereby at least one inlet will be submerged in fuel under negative as well as positive gravity flight conditions.

9. A multiple pump and motor unit adapted for submersion in liquid in an aircraft tank which comprises a single electric motor, drive shafts extending from the ends of said motor, pump casings at the ends of said motor, a pump impeller in each pump casing coupled with one of the drive shafts, means for mounting the unit in upright position in a tank to position the inlets of the pumps at vertically separated levels, whereby at least one pump will be submerged under negative as well as positive gravity flight conditions and a clutch in the drive shaft between the top pump and the motor automatically operable to couple the impeller in the top shaft with the motor under negative gravity flight conditions.

PAUL J. LANSING.

REFERENCES CITED

The following references are of record in the file of this patent:

UNITED STATES PATENTS

| Number | Name | Date |
|---|---|---|
| 1,049,894 | Merrill | Jan. 7, 1913 |
| 2,292,664 | Schwartz | Aug. 11, 1942 |

FOREIGN PATENTS

| Number | Country | Date |
|---|---|---|
| 607,852 | Great Britain | Sept. 6, 1948 |